United States Patent [19]

Ohya

[11] Patent Number: 5,493,727
[45] Date of Patent: Feb. 20, 1996

[54] ELECTRONIC EQUIPMENT INCLUDING MEANS FOR CONTROLLING READING OF CONTROL PROGRAMS

[75] Inventor: Toshikazu Ohya, Yokohama, Japan

[73] Assignee: Canon Kabushiki Kaisha, Tokyo, Japan

[21] Appl. No.: 262,368

[22] Filed: Jun. 20, 1994

Related U.S. Application Data

[63] Continuation of Ser. No. 956,575, Oct. 5, 1992, abandoned, which is a continuation of Ser. No. 369,858, Jun. 22, 1989, abandoned.

[30] Foreign Application Priority Data

Jun. 29, 1988 [JP] Japan ................................. 63-159263

[51] Int. Cl.[6] ............................. G06F 9/24; G06F 9/445; G06F 13/366
[52] U.S. Cl. .................. 395/800; 364/229.5; 364/230.5; 364/231.6; 364/239.4; 364/247.3; 364/246.3; 364/246.5; 364/254.3; 364/265.3; 364/DIG. 1; 364/DIG. 2; 395/775; 395/182.03; 395/183.13
[58] Field of Search .............................. 395/800, 84, 200, 395/700, 325, 650, 575, 250, 775, 725, 165; 371/11.1, 11.2, 11.3, 8.1, 68.1; 340/825.02, 825.03, 825.08, 825.1, 825.15, 825.13, 825.22, 825.05; 364/DIG. 1, DIG. 2

[56] References Cited

U.S. PATENT DOCUMENTS

| | | | |
|---|---|---|---|
| 4,683,531 | 7/1987 | Kelch et al. | 395/725 |
| 4,686,626 | 8/1987 | Kuroki et al. | 364/426.01 |
| 4,730,251 | 3/1988 | Aakre et al. | 395/325 |
| 4,736,340 | 4/1988 | Desserrieres et al. | 364/900 |
| 4,747,100 | 5/1988 | Roach et al. | 370/85.5 |
| 4,777,330 | 10/1988 | Nakayashiki et al. | 371/11.2 |
| 4,792,955 | 12/1988 | Johnson et al. | 371/11.1 |
| 4,864,492 | 9/1989 | Blakely-Fogel et al. | 395/200 |
| 4,937,777 | 6/1990 | Flood et al. | 364/900 |
| 4,947,314 | 8/1990 | Sumida | 364/140 |
| 4,954,945 | 9/1990 | Inoue | 395/650 |
| 5,109,484 | 4/1992 | Hughes et al. | 395/200 |
| 5,121,497 | 6/1992 | Kerr et al. | 395/650 |
| 5,168,555 | 12/1992 | Byers et al. | 395/325 |

*Primary Examiner*—Daniel H. Pan
*Attorney, Agent, or Firm*—Fitzpatrick, Cella, Harper & Scinto

[57] ABSTRACT

A program-controlled electronic equipment comprises a memory for storing status information of the presence or absence of each of a plurality of elements, and a loader for loading a plurality of control programs for controlling the elements. Control means controls the loader such that the loader loads only those control programs which control the existing elements, in accordance with the status information stored in the memory.

5 Claims, 3 Drawing Sheets

16,493,727

ELECTRONIC EQUIPMENT INCLUDING MEANS FOR CONTROLLING READING OF CONTROL PROGRAMS

This application is a continuation of application Ser. No. 07/956,575 filed Oct. 5, 1992, now abandoned, which is a continuation of application Ser. No. 07/369,858 filed Jun. 22, 1989, which is now abandoned.

BACKGROUND OF THE INVENTION

1. Field of the Invention

The present invention relates to program-controlled electronic equipment, and more particularly to an electronic equipment which attains various functions by executing an externally loaded control program.

2. Related Background Art

Peripheral devices such as a printer which have their functions controlled by an externally loaded program have recently been marketed.

Such a device usually comprises a fundamental portion which is essential to the device and various optional features. Accordingly, depending on a combination of the optional features, various types of equipment from a minimum function to a variety of functions may be provided.

In such an equipment, a control program which is compatible to the control of all functions is loaded irrespectively of the configuration of the equipment, or a control program which conforms to the configuration of the equipment is loaded. In the former case, an unnecessary program which cannot be used in the equipment is loaded. In the latter case, another control program is required if the configuration of the equipment is partially modified or an equipment of a different configuration is installed.

SUMMARY OF THE INVENTION

It is an object of the present invention to provide an electronic equipment which detects a configuration of the equipment and efficiently functions in accordance with the configuration of the equipment.

It is another object of the present invention to provide an electronic equipment which reads a plurality of control programs and does not load those control programs which are not necessary for the configuration of the equipment.

It is a further object of the present invention to provide an electronic equipment which reads a plurality of control programs and loads only those control programs which are necessary for the configuration of the equipment.

It is still a further object of the present invention to provide an electronic equipment which reads a plurality of control programs and loads only a group of control programs which are proper to the configuration of the equipment.

DESCRIPTION OF THE PREFERRED EMBODIMENT

Figure 1:
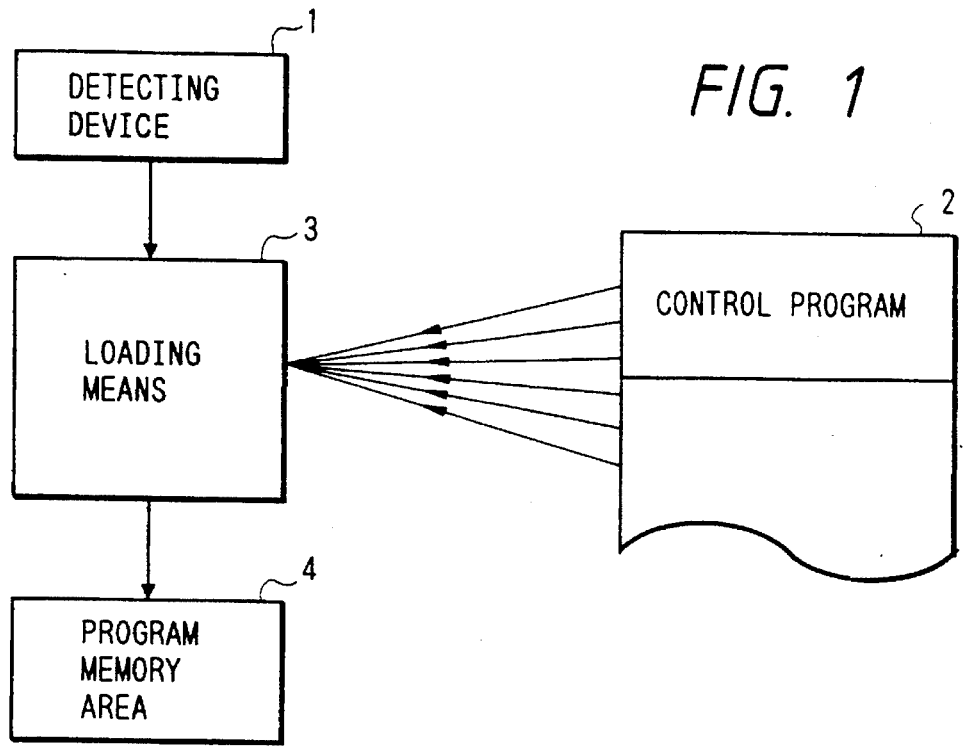
FIG. 1 shows a functional block diagram of a control unit of an electronic equipment, in accordance with one embodiment.

FIG. 1 shows a functional block diagram of a control unit of an electronic equipment in accordance with one embodiment. Numeral 1 denotes detection means which scans a hardware configuration (not shown) to detect the presence or absence of predetermined hardware in the equipment. Numeral 2 denotes a control program storage which may comprise an external storage device. It stores all control program modules for all hardware modules included in the configuration of the equipment. Numeral 3 denotes load means which selects from the control program storage 2 those control program modules for the hardware modules whose presence has been detected by the detection device 1 and loads the selected control program modules to the equipment. Numeral 4 denotes a program memory area which stores the loaded control program.

Figure 2:
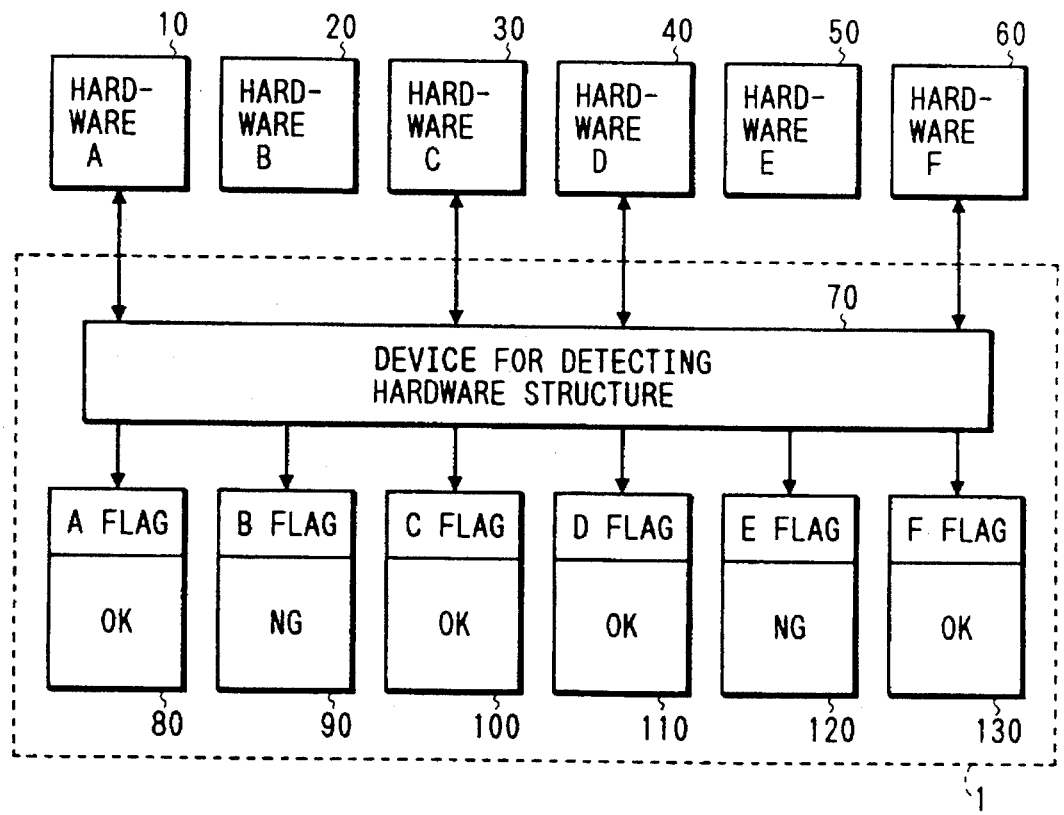
FIG. 2 shows a functional block diagram of a detection device of the embodiment.

FIG. 2 shows a functional block diagram of the detection device of the embodiment. Numerals 10–60 denote hardware modules (including interface circuits and mechanical units) of all functions of the electronic equipment.

Assuming a printer (laser beam printer) as the electronic equipment, the hardware A 10 is a basic feed sheet stacker control unit, the hardware B 20 is an additional feed sheet stacker control unit, the hardware C 30 is an exposure control unit, the hardware D 40 is a development/fixing control unit, the hardware F 60 is a basic eject sheet stacker control unit, and the hardware E 50 is an additional eject sheet stacker control unit. It is seen that the additional feed sheet stacker control unit 20 and the additional eject sheet stacker control unit 50 are not connected in FIG. 2. Namely, the configuration includes one input stacker and one output stacker.

Numeral 70 denotes a device for detecting the presence or absence of the hardware module. It sequentially accesses the interface circuits of the hardware A 10 to hardware F 60 by channel addresses through a bus line. If a bus error occurs or no response comes back, it is determined that the hardware module is not connected to the channel. Numerals 80–130 denote flag memories for storing the presence or absence of the hardware modules. If the hardware module is present, a flag OK is stored, and if it is not present, a flag NG is stored.

Figure 3:
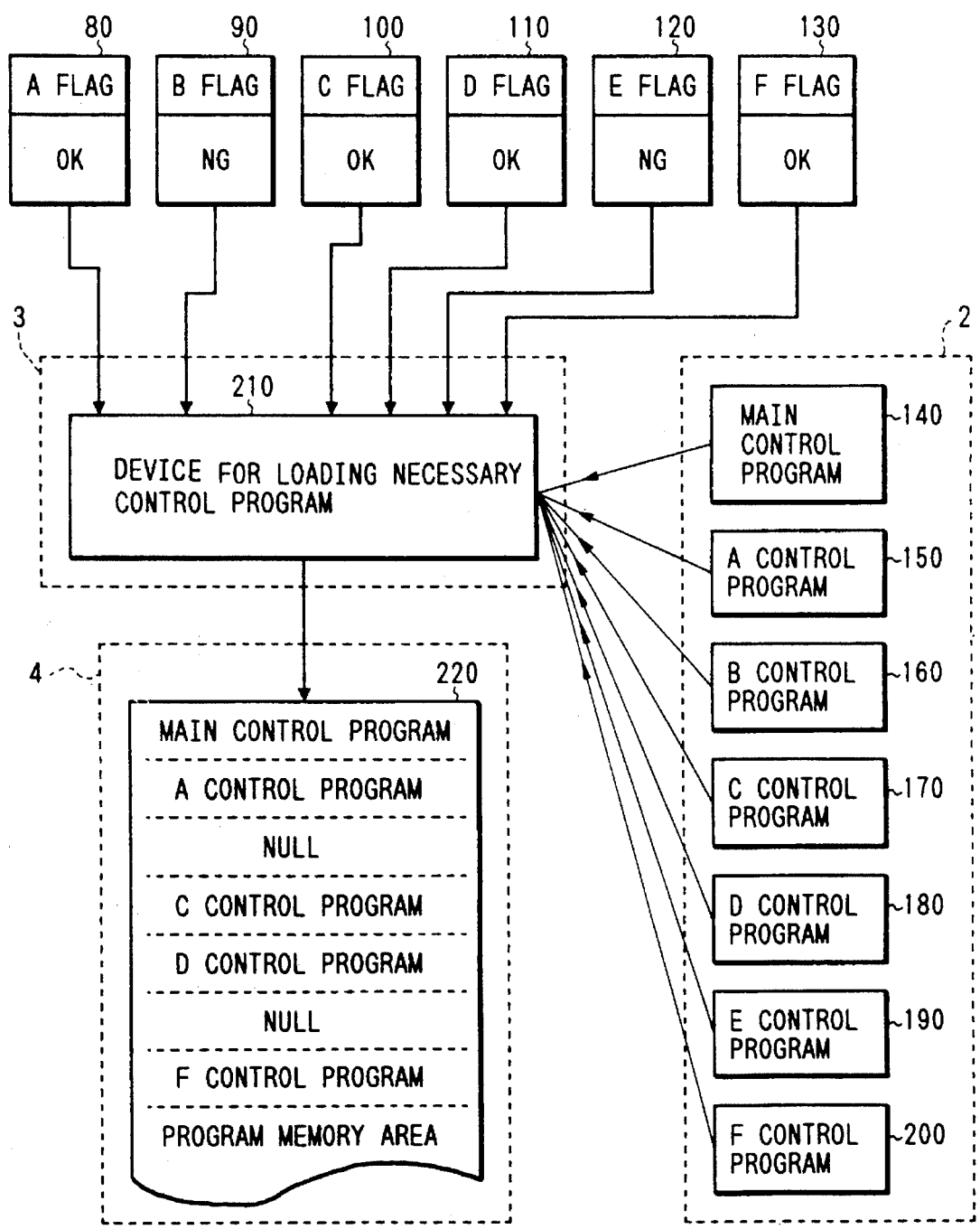
FIG. 3 illustrates loading of a control program in the embodiment.

FIG. 3 illustrates a load process of the control program in the embodiment. Numeral 140 denotes a main control program which does not depend on the presence or absence of the hardware module, and numerals 150–200 denote control program modules corresponding to the hardware modules A–F. Numeral 210 denotes means for loading necessary programs. First, it unconditionally loads the main control program 140. Then, it loads the control program modules corresponding to the existing hardware modules, in accordance with the contents of the flag memories 80–130. The loading is done from predetermined addresses of the program memory area 4. The program module which need not be loaded is skipped in the secondary memory. It is also skipped in the program memory area 4 which has NULL. Accordingly, the loading time for this area is saved. When all necessary control programs have been loaded, the load means 210 shifts the control to the top address of the main control program and the process is terminated. The main control program 140 examines the contents of the flag memories 80–130 and shifts the control to the corresponding control program modules. It does not shift the control to the address at which no program module is present.

In the above embodiment, the memory area in which the control program module is not to be loaded is indicated as NULL. If a CPU (not shown) has a program relocation function, the control program modules may be loaded from any address. Accordingly, it is not necessary to leave the NULL area and the control program memory area can be saved accordingly. This is also true when the CPU has a paging function.

In the above embodiment, the detection means 1 is used to detect the hardware configuration and the control programs are loaded in accordance with the detection result. Alternatively, a user may input information on the hardware configuration (structure) by input means (not shown) and the control programs may be loaded in accordance with the input information.

Alternatively, where combinations of hardware modules are limited to several types, the corresponding control programs may be patterned so that they can be efficiently loaded.

Figure 4:
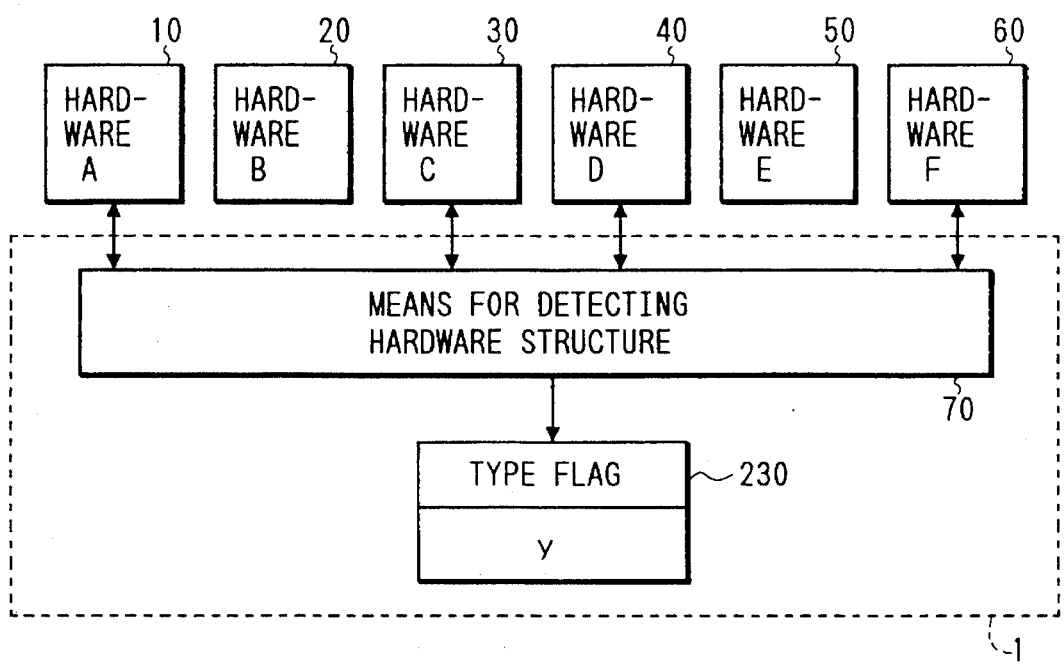
FIG. 4 shows a functional block diagram of detection means in another embodiment.

FIG. 4 shows a functional block diagram of a control unit of the electronic equipment in accordance with another embodiment. The hardware module detection means 70 detects the presence or absence of the hardware A 10 to hardware F 60 and determines the type of combination in accordance with a table (not shown). For example, there are three types x, y and z for three combinations. In the present embodiment, a type flag 230 is provided and it stores the determined type, for example, type y.

Figure 5:
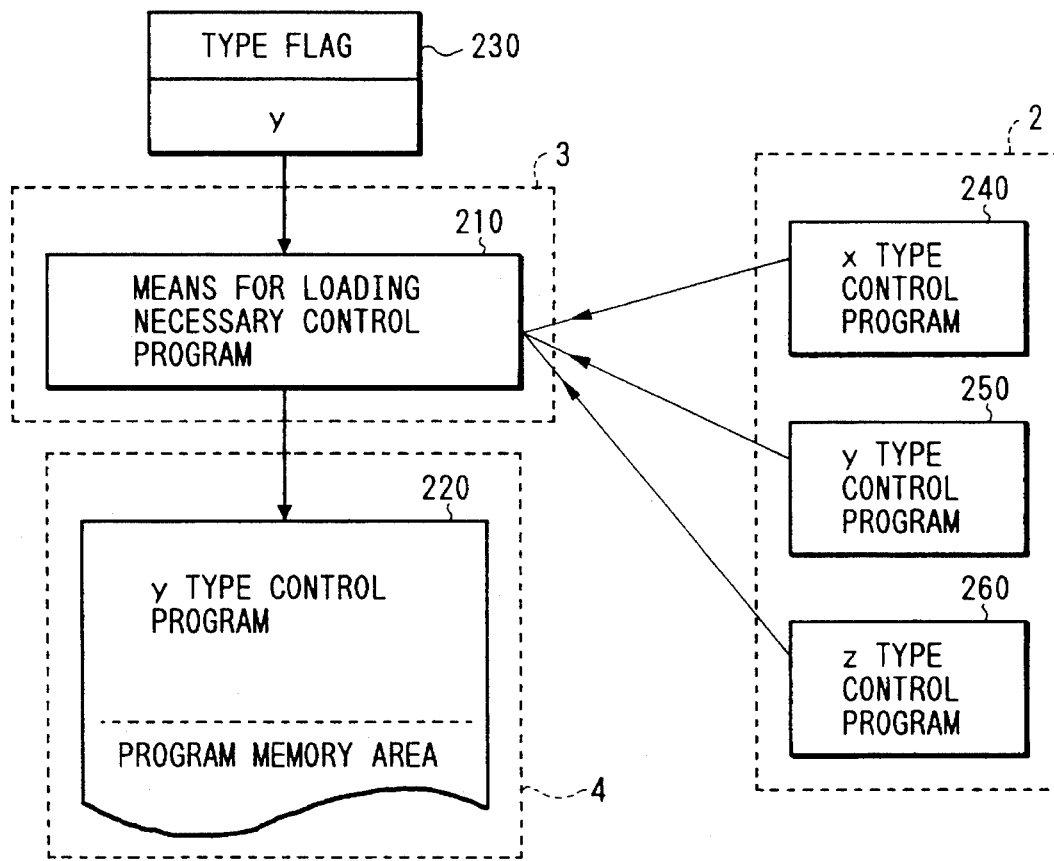
FIG. 5 illustrates loading of the control program in the other embodiment.

FIG. 5 illustrates a load process of the control program in the present embodiment. Numerals 240–260 denote control programs corresponding to the three types x, y and z of the combinations of the hardware modules. The load means 210 loads the y type control program 250 into the program memory area 220 in accordance with the content y of the type flag 230.

The common control program modules in the respective control programs are stored in duplicate on the secondary memory, but only one type of control program need be loaded. Accordingly, the efficiency is improved.

According to the present invention, the control program which conforms to the hardware configuration is loaded. Accordingly, the electronic equipment starts up in a minimum time, the loading efficiency is improved, and the equipment can immediately operate.

I claim:

1. A program-controlled electronic equipment comprising:

storage means for storing status information on the presence or absence of each of a plurality of devices capable of being an element in the equipment;

external memory means including a plurality of memory blocks, for storing a plurality of control programs for controlling the devices, said memory blocks storing control programs corresponding to predetermined available combinations of the devices, respectively, wherein each of the memory blocks stores a plurality of control programs corresponding to a different combination of the devices and a control program for controlling a common device in different combinations is stored in duplicate in memory blocks corresponding to the different combinations;

determination means for determining which of the predetermined combinations accorded to a set of devices exist in said equipment according to the status information stored in said storage means;

loading means for loading a memory block from said external memory means; and control means for controlling said loading means to load one of said memory blocks corresponding to the predetermined combination determined by said determination means.

2. A program-controlled electronic equipment according to claim 1, further comprising detection means for detecting and inputting the status information on the presence or absence of the devices.

3. A program-controlled electronic equipment according to claim 1 further comprising detection means for detecting the status information on the presence or absence of the devices.

4. A program-controlled electronic equipment according to claim 3, wherein said detection means accesses each of the devices and determines the presence of the device by success of the access.

5. A method of loading control programs from an external memory in electronic equipment, said method comprising the steps of:

storing a plurality of control programs for controlling devices, in a plurality of memory blocks in an external memory, wherein control programs corresponding to each of predetermined available combinations of the devices are stored in respective memory blocks, and wherein each of the memory blocks stores a plurality of control programs corresponding to a different combination of the devices and a control program for controlling a common device in different combinations is stored in duplicate in memory blocks corresponding to the different combinations;

storing status information on the presence or absence of each of a plurality of devices capable of being an element in the equipment in an internal memory;

determining which of the predetermined combinations accorded to set of devices exist in the equipment according to the status information stored in the internal memory; and loading one of the memory blocks, corresponding to the predetermined combination determined to accord to the set of devices existing in the equipment, from the external memory.

\* \* \* \* \*

UNITED STATES PATENT AND TRADEMARK OFFICE
CERTIFICATE OF CORRECTION

PATENT NO. : 5,493,727

DATED : February 20, 1996

INVENTOR(S) : TOSHIKAZU OHYA

It is certified that error appears in the above-identified patent and that said Letters Patent is hereby corrected as shown below:

TITLE PAGE:
[54] TITLE

"READING" should read --LOADING--.

COLUMN 1

Line 2, "READING" should read --LOADING--.

COLUMN 2

Line 5, "EMBODIMENT" should read --EMBODIMENTS--.
   Line 9, "detection means" should read
       --a detection device--.
   Line 21, "progrum." should read --program.--.
   Line 54, "means" should read --a device--.

COLUMN 3

Line 12, "means 1" should read --device 1--.

UNITED STATES PATENT AND TRADEMARK OFFICE
CERTIFICATE OF CORRECTION

PATENT NO. : 5,493,727
DATED : February 20, 1996
INVENTOR(S) : Toshikazu Ohya

It is certified that error appears in the above-indentified patent and that said Letters Patent is hereby corrected as shown below:

Column 4

Line 24, "claim 1" should read --claim 1, --.
Line 49, "set" should read --a set--.

Signed and Sealed this

Twenty-seventh Day of August, 1996

Attest:

BRUCE LEHMAN

Attesting Officer  Commissioner of Patents and Trademarks